United States Patent Office 3,176,389
Patented Apr. 6, 1965

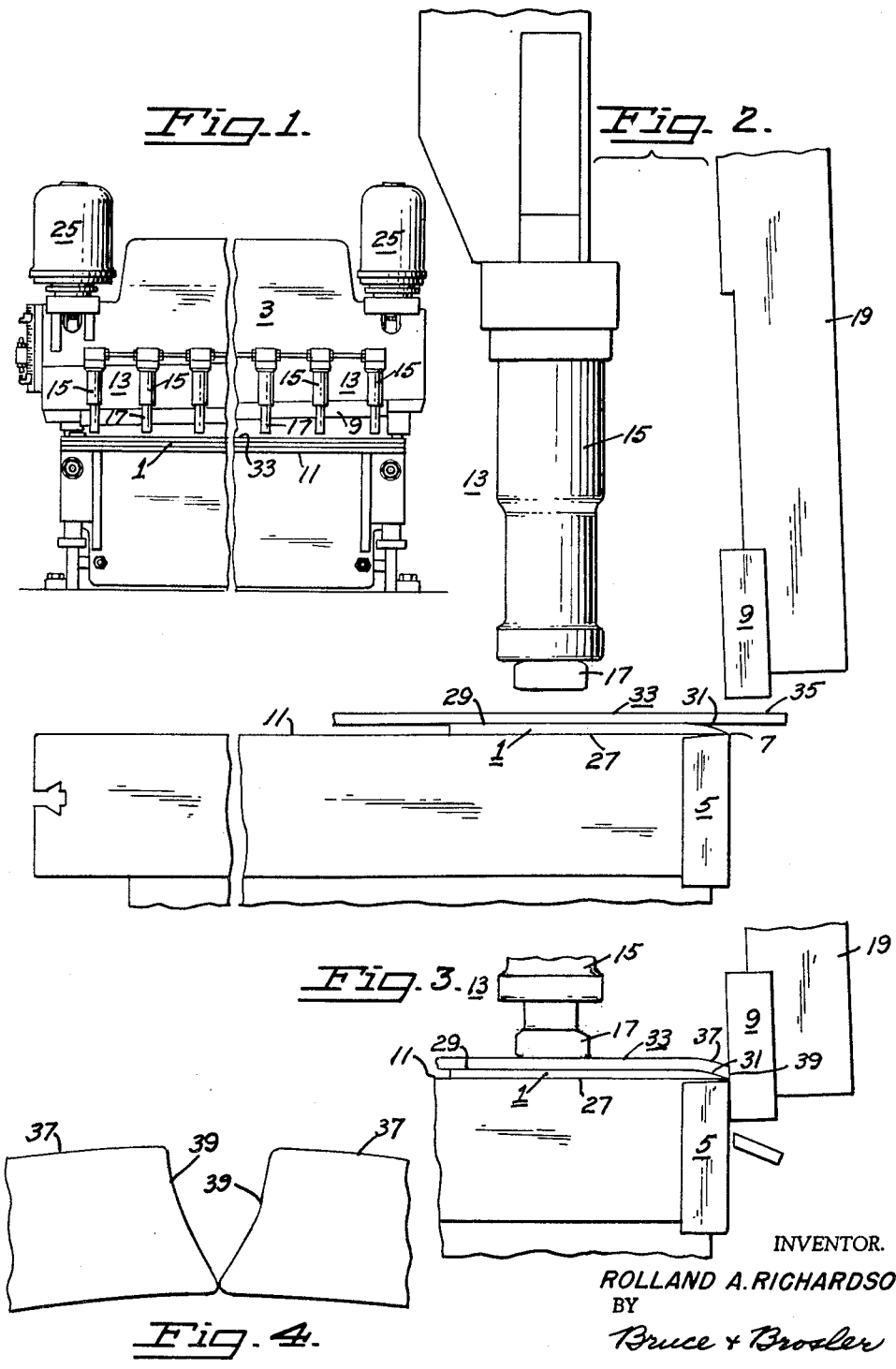

3,176,389
METHOD OF FABRICATING CYLINDER FROM HEAVY METAL PLATE
Rolland A. Richardson, Alameda, Calif., assignor to Pacific Industrial Manufacturing Co., a corporation of California
Original application June 9, 1958, Ser. No. 740,750. Divided and this application Mar. 30, 1962, Ser. No. 183,934
3 Claims. (Cl. 29—477)

My invention relates to the fabrication of hollow cylinders or rings of metal, and more particularly to a method of fabricating cylinders and rings from heavy metal plate or bar stock.

This application is a division of my application for Apparatus and Method of Fabricating Cylinders From Heavy Metal Plate, Serial No. 740,750, filed June 9, 1958, and now abandoned.

Since a ring is but a narrow hollow cylinder and the bar stock from which the ring might be formed is but a narrow strip of heavy metal plate, the terms "hollow cylinder" and "metal plate" will hereafter be employed in a broad, generic sense to include "ring" and "bar stock" respectively.

In fabricating a hollow cylinder from heavy metal plate, the metal plate is passed between plate bending rolls. Ordinarily, such metal plate would emerge as an incompletely closed cylinder with the facing ends of the rolled plate approaching each other, not on an arc, but at an angle, so that if such ends were brought together for welding, a true cylinder would not result.

It, therefore, becomes desirable to preform the ends of the plate by forming such ends on an arc having a radius of curvature corresponding closely to the radius of the cylinder to be ultimately produced. Such operation might be descriptively referred to as pre-arcing. When this is done, the edges of the plate may be brought together, following passage between the bending rolls, to form a true cylinder, but the edges of the plate will meet flush. This is not desirable for welding, so therefore, it further becomes desirable to pre-bevel the edges of the plate so that when ultimately brought together, they form a trough along which weld metal may be deposited to form a strong weld.

These preforming operations as currently performed, require use of different machines to perform the beveling and arcing operations and at the same time involve substantial labor, thus making this a relatively expensive procedure.

Among the objects of the present invention are:
(1) To provide novel and improved method for beveling and pre-arcing the ends of a metal plate in preparation for rolling the same into cylindrical form;
(2) To provide novel and improved method for beveling and pre-arcing an end of a metal plate in one simple operation;
(3) To provide novel and improved method for beveling and pre-arcing an end of a metal plate, such method involving but a minor addition to conventional available equipment; and
(4) To provide a novel and improved forming plate for use with a conventional type power shear to pre-arc and bevel the end of a metal plate.

Additional objects of my invention will be brought out in the following description of a preferred embodiment of the same taken in conjunction with the accompanying drawings, wherein:

FIGURE 1 is a front view in elevation of the type of apparatus employable in the practice of the present invention;

FIGURE 2 is a view depicting on an enlarged scale, a fragmentary portion of the apparatus of FIGURE 1, as viewed from the side and ready for operation;

FIGURE 3 is a view similar to that of FIGURE 2, but depicting the apparatus following operation thereof; and FIGURE 4 is a fragmentary view depicting the results of the method involved in the present invention.

Referring to the drawings for details of my invention in its preferred form, I have found that both the beveling and pre-arcing operations may be accomplished in one stage through the application of a suitable forming plate 1 to a power shear 3 of a conventional type having a lower horizontal knife 5 including a shearing edge 7 and an upper angularly disposed knife 9 in shearing relationship to the lower knife.

Such shear is provided with a work supporting table 11 terminating adjacent the lower knife, and hold-down means 13 usually in the form of a plurality of cylinders 15 and includes pistons 17 spaced above and transversely of the table, the function of the hold down means being to clamp work to the table to immovably hold the same while a shearing operation takes place.

The upper knife is mounted in an upper knife holder 19 which is slidably mounted for vertical movement on guides, and actuated preferably hydraulically through cylinder-piston assemblies 25 supported above on the framework of the machine. The knife holder 19 and knife 9 carried thereby are preferably supported at a slight forward tilt angle.

The forming plate 1 has a planar bottom or lower side 27 for contacting the planar surface of the table 11, and an upper side including a parallel planar surface 29 and a substantial arcuate surface 31 meeting the lower side along a relatively sharp straight edge.

The forming plate is disposed on the table with its sharp edge adjacent the shearing edge 7 of the lower knife, and a plate 33 whose ends are to be preformed, is positioned on the forming plate with one end 35 extending beyond and overhanging the lower knife. With the forming plate 1 and the plate 33 to be operated on, thus properly positioned in the machine, the hold down means 13 are actuated to clamp the same to the table 11.

The end 35 of the plate to be preformed is thus supported in spaced relationship to the shearing edge of the lower knife, and consequently as the upper knife is lowered, a pre-arcing of the end of the plate occurs to form an arc 37 before shearing can take place. This procedure is the reverse of that normally followed in accordance with prior art practice, and is important to the present invention in that the upper knife will of necessity have to shear through plate material which lies at an acute angle thereto, causing a bevel 39 to be formed as shearing occurs.

It is also significant to note, that due to the angular disposition of the upper knife 9 in its holder 19, bending and shearing at all points transversely of the plate does not occur simultaneously, but instead, the bending and shearing force is applied progressively from point to point transversely of the plate. This is important to the invention in its preferred form, in that it enables one to hold power requirements down to a minimum.

As to the length of the forming plate 1 in the longitudinal direction, it should be relatively short so that, following the first pre-arcing and shearing operation, the plate being worked on, may be reversed to bring its opposite end in position for pre-arcing and shearing.

The arcuate portion 31 of the forming plate will have a radius of curvature corresponding closely to the radius of the cylinder to be ultimately produced, and thus one forming plate may be utilized in the forming of cylinders within a limited range of radii. For a cylinder differing substantially in radius, a forming plate having a different radius of curvature for its arcuate surface will be utilized. Thus a few forming plates may be relied on to take care of a relatively wide range of cylinder sizes.

For the purpose of the present invention, a hydraulically powered shear possesses marked advantages over a mechanically operated shear, where energy stored up in a fly wheel is normally relied on to overcome the sudden increase in load when the upper knife initially engages the work, and then have sufficient energy left to impart uniform movement to the knife throughout the shearing stroke. With the increase in load attributable to the arcing operation and the additional thickness of metal to be sheared when shearing on an angle, the fly wheel of an otherwise adequate mechanically operated shear may now be found not to have sufficient stored energy in the fly wheel to carry through the combined pre-arcing and beveling operations, thus necessitating an increase in the power available to the machine or the use of a shear designed to higher power requirements.

With a hydraulically operated shear on the other hand, such machine can deliver full power at any point in its stroke and therefore will alter its power input in accordance with the load demands placed thereon.

From the foregoing discussion of my invention in its preferred form, it will be apparent that the same may be altered without departing from the underlying principles involved, and I accordingly do not desire to be limited in my protection to the specific details illustrated and described, except as may be necessitated by the appended claims.

I claim:

1. The method of forming a metal plate into a cylinder, comprising
   placing an end of said metal plate above the lower knife of a power shear with said end in spaced relationship to the shearing edge of said lower knife,
   arcing said plate end into contact along the shearing edge of said lower knife and shearing said plate as it contacts said knife along its shearing edge to produce a bevel,
   similarly beveling the opposite end of said plate to produce a bevel having a reverse slope with respect to said first bevel,
   rolling said plate into substantially a cylinder and bringing the proximate edges of said beveled ends together to form a trough,
   and depositing weld material along said trough to weld said beveled ends together.

2. The method of preparing a metal plate in preparation for rolling the same into a cylinder, comprising
   placing an end of said metal plate above the lower knife of a power shear with said end in spaced relationship to the shearing edge of said lower knife,
   progressively arcing said plate end from point to point transversely of said plate while progressively providing backing for said plate and during arcing, down to the shearing edge of said lower knife, to progressively bring said plate end into contact along the shearing edge of said lower knife and shearing said plate as it progressively contacts said lower knife along its shearing edge, to form a bevel,
   and similarly arcing and beveling the opposite end of said plate to produce a bevel having a reverse slope with respect to said first bevel.

3. The method of preforming an end of a metal plate in preparation for rolling the same into a cylinder, comprising
   placing such end of said metal plate above the lower knife of a power shear with said end in spaced relationship to the shearing edge of said lower knife,
   progressively bringing said plate end from point to point transversely of said plate into contact with the shearing edge of said lower knife and along a bending radius such as to form an arc having substantially the curvature of the cylinder to be fabricated,
   and shearing said plate as it progressively contacts said lower knife along its shearing edge, to form a bevel across the thickness of said plate at the free edge of said arc.

References Cited by the Examiner

UNITED STATES PATENTS

| | | | |
|---|---|---|---|
| 1,978,685 | 10/34 | Mogford et al. | 29—482 |
| 2,573,767 | 11/51 | Jensen et al. | 153—2 |

JOHN F. CAMPBELL, *Primary Examiner.*